(12) United States Patent
Yang et al.

(10) Patent No.: US 7,549,325 B1
(45) Date of Patent: Jun. 23, 2009

(54) GLIDE HEAD WITH ACTIVE DEVICE

(75) Inventors: Pei-Hsiang Yang, San Jose, CA (US); John R. Love, Livermore, CA (US); Franz Mairhofer, San Jose, CA (US)

(73) Assignee: Maxtor Corporation, Scotts Valley, CA (US)

( * ) Notice: Subject to any disclaimer, the term of this patent is extended or adjusted under 35 U.S.C. 154(b) by 92 days.

(21) Appl. No.: 11/136,918

(22) Filed: May 25, 2005

Related U.S. Application Data

(60) Provisional application No. 60/576,872, filed on Jun. 3, 2004.

(51) Int. Cl.
*G01B 5/28* (2006.01)
(52) U.S. Cl. .................................................. 73/105
(58) Field of Classification Search .................... 73/105
See application file for complete search history.

(56) References Cited

U.S. PATENT DOCUMENTS

| | | | |
|---|---|---|---|
| 5,963,396 A * | 10/1999 | Burga et al. ............ 360/236.9 |
| 6,023,963 A | 2/2000 | Schaenzer et al. ............ 73/105 |
| 6,185,993 B1 | 2/2001 | Schaenzer et al. ............ 73/105 |
| 6,233,119 B1 * | 5/2001 | Burga et al. ............ 360/236.9 |
| 6,272,909 B1 * | 8/2001 | Yao et al. ...................... 73/105 |
| 6,338,269 B1 * | 1/2002 | Burga et al. ................... 73/105 |
| 6,526,815 B1 * | 3/2003 | Smith, Jr. ...................... 73/105 |
| 6,568,252 B1 * | 5/2003 | Boutaghou ................... 73/104 |
| 6,867,948 B1 * | 3/2005 | Schulz et al. ............ 360/245.9 |
| 6,899,456 B2 * | 5/2005 | Sundaram et al. ............... 374/4 |
| 2005/0262922 A1 * | 12/2005 | Chu et al. ................... 73/1.81 |

* cited by examiner

Primary Examiner—John Fitzgerald

(57) ABSTRACT

A glide head having a portion thereof that is selectively extendable toward the rotating disk by the application of an electrical signal thereto. The extendable portion may be located on a side wing extending from a slider main body. The side wing may include a piezoelectric transducer with a relatively durable contact layer provided on the bottom portion thereof. The slider can be flown relatively close to the rotating media and the transducer can be activated to actuate the contact layer into a closer position relative to the rotating disk. The distance at which physical contact occurs may be measured.

22 Claims, 3 Drawing Sheets

GLIDE HEAD WITH ACTIVE DEVICE

CROSS-REFERENCE TO RELATED APPLICATIONS

This application claims priority from U.S. Provisional Patent Application No. 60/576,872, filed Jun. 3, 2004, entitled "Active Device Glide Head for Ultra Low Glide Detection for rotating Media", the contents of which are incorporated herein by reference.

BACKGROUND

In hard disk drives, data is written to and read from magnetic recording media, herein called disks. Typically, one or more disks having a thin film of magnetic material coated thereon are rotatably mounted on a spindle. A read/write head mounted on an actuator arm is positioned in close proximity to the disk surface to write data to and read data from the disk surface.

During operation of the disk drive, the actuator arm moves the read/write head to the desired radial position on the surface of the rotating disk where the read/write head electromagnetically writes data to the disk and senses magnetic field signal changes to read data from the disk. Usually, the read/write head is integrally mounted in a carrier or support referred to as a slider. The slider generally serves to mechanically support the read/write head and any electrical connections between the read/write head and the disk drive. The slider is aerodynamically shaped, which allows it to fly over and maintain a uniform distance from the surface of the rotating disk. Typically, the read/write head includes a magnetoresistive read element to read recorded data from the disk and an inductive write element to write the data to the disk.

Modern reliability requirements for disk drive systems require each disk to be tested prior to installation in a disk drive system. A portion of this testing is glide testing, where a disk is characterized to determine the maximum height of any non-planar regions, or asperities. This height is known as the glide height for that particular disk. With extremely low flying heights of heads in the modern disk drive systems, it is important to know that a disk does not have asperities greater than a certain height. Disks with glide heights greater than a certain amount can be discarded. This will substantially reduce the number of times a read/write head is struck by a rotating disk in operation, and thus will increase the reliability of disk drive systems.

Typically, a glide height test station is used. The station may include a spindle on to which a disk is placed. The station may also include a head mount block to support a pair of glide heads relative to the disk, with one head proximate to and just above the disk and one head proximate to and just below the disk. The glide heads are generally similar in shape to read/write heads, but do not necessarily include read or write transducers. The primary function of a glide head is to fly close to the surface of the disk and assist in the detection of interference or physical contact with the disk. Typically, this contact is sensed with either an acoustic-emission sensor or a piezoelectric sensor. An acoustic-emission sensor may be provided at the head mounting block or fixture to sense the vibrations of the glide head associated with physical contact with the rotating disk. The piezoelectric sensor is provided in the glide head to supply an electrical signal as a result of the contact with the rotating disk and forces applied throughout the glide head. With either type of sensor, the magnitude of the signal sensed is a function of the disk rotational speed.

It can be appreciated that it is desirable to fly the glide head at the same height for each disk to be tested. With most head designs, however. the fly height is proportional to the disk rotational speed. Since each manufactured glide head will have slightly different surfaces and thus slightly different flying characteristics, it might take a slightly different speed to get each head to an identical height. With two heads in each glide test station, however, give rotational speed for the disk under test may result in two different heights. One approach in the past has been to sort and match-up glide heads to reduce this problem. This approach has many drawbacks such as low yield and the fact that the glide heads are typically sorted by fly height for a given velocity and not by their ability to detect glide height Another approach has been to design glide heads that have a fly height that is much less dependent on disk rotational speed. In such case, sorting issue described above is greatly minimized but there is another drawback. Many modern glide test protocols test the disk at two different fly heights. With these relatively-fixed fly height heads, positioning the glide head at the two different heights can be difficult.

The foregoing examples of the related art and limitations related therewith are intended to be illustrative and not exclusive. Other limitations of the related art will become apparent to those of skill in the art upon a reading of the specification and a study of the drawings.

SUMMARY OF THE INVENTION

The following embodiments and aspects of thereof are described and illustrated in conjunction with systems, tools, and methods which are meant to be exemplary and illustrative, and not limiting in scope. In various embodiments, one or more of the above-described problems have been reduced or eliminated, while other embodiments are directed to other improvements.

A glide head for characterizing a disk to be used in a disk drive system includes a main body having a portion thereon which is selectably extendable therefrom toward the adjacent disk.

The selectably extendable portion may be located on a side wing. The selectably extendable portion may include a piezoelectric transducer. The selectably extendable portion may include a contact surface that is adapted for physically contacting the disk.

A method of characterizing a disk to be used in a disk drive system includes providing a glide head in close proximity to a spinning disk, extending a relatively small portion of the glide head toward the disk while maintaining the remainder of the glide head at a relatively constant distance away from the disk, and rotating the disk to detect portions of the disk at which the relatively small portion of the glide head makes physical contact with the disk.

A glide head for characterizing a disk to be used in a disk drive system includes a main body and a side wing extending away from the main body, the side wing having a bottom surface that is significantly smaller than the bottom surface of the main body, the side wing having a transducer thereon to selectably displace at least a portion of the bottom surface of the side wing toward the adjacent disk.

A system for characterizing a disk to be used in a disk drive system includes a spindle that rotates the disk to be characterized, a glide head, and a suspension that positions the glide head in close proximity to the disk. The glide head has a portion thereon which selectably extendable therefrom toward the adjacent disk, wherein the portion is extended until it comes into physical contact with the disk. The system further includes a sensor associated with the suspension, the sensor sensing mechanical vibrations in the suspension indicative of physical contact between the glide head and the disk.

In addition to the exemplary aspects and embodiments described above, further aspects and embodiments will become apparent by reference to the drawings and by study of the following descriptions.

BRIEF DESCRIPTION OF THE DRAWINGS

Exemplary embodiments are illustrated in referenced figures of the drawings.

It is intended that the embodiments and figures disclosed herein be considered illustrative rather than limiting.

DETAILED DESCRIPTION

Reference will now be made to the accompanying drawings, which assist in illustrating the various pertinent features of the present invention. Although the present invention will now be described primarily in conjunction with disk drives, it should be expressly understood that the present invention may be applicable to other applications where characterization of glide height is required/desired. In this regard, the following description of a disk drive is presented for purposes of illustration and description. Furthermore, the description is not intended to limit the invention to the form disclosed herein. Consequently, variations and modifications commensurate with the following teachings, and skill and knowledge of the relevant art, are within the scope of the present invention. The embodiments described herein are further intended to explain modes known of practicing the invention and to enable others skilled in the art to utilize the invention in such, or other embodiments and with various modifications required by the particular application(s) or use(s) of the present invention.

Figure 1:
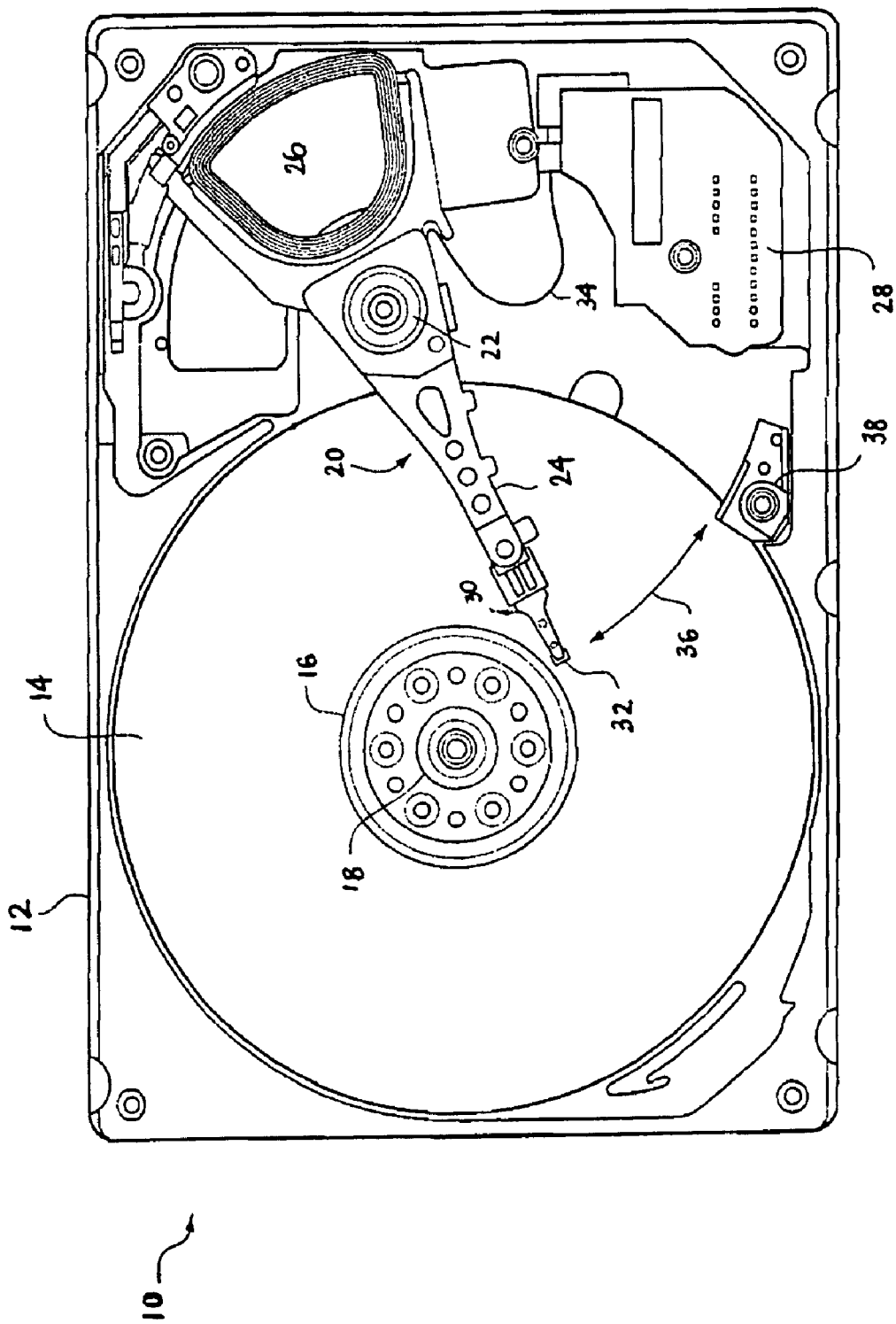
FIG. 1 is a top view of a disk drive that utilizes a head of the present invention.

FIG. 1 illustrates one embodiment of a disk drive 10. The disk drive 10 generally includes a base plate 12 and a cover (not shown) that may be disposed on the base plate 12 to define an enclosed housing or space for the various disk drive components. The disk drive 10 includes one or more data storage disks 14 of any appropriate computer-readable data storage media. Typically, both of the major surfaces of each data storage disk 14 include a plurality of concentrically disposed tracks for data storage purposes. Each disk 14 is mounted on a hub or spindle 16, which in turn is rotatably interconnected with the disk drive base plate 12 and/or cover. Multiple data storage disks 14 are typically mounted in vertically spaced and parallel relation on the spindle 16. Rotation of the disk(s) 14 is provided by a spindle motor 18 that is coupled to the spindle 16 to simultaneously spin the data storage disk(s) 14 at an appropriate rate.

The disk drive 10 also includes an actuator arm assembly 20 that pivots about a pivot bearing 22, which in turn is rotatably supported by the base plate 12 and/or cover. The actuator arm assembly 20 includes one or more individual rigid actuator arms 24 that extend out from near the pivot bearing 22. Multiple actuator arms 24 are typically disposed in vertically spaced relation, with one actuator arm 24 being provided for each major data storage surface of each data storage disk 14 of the disk drive 10. Other types of actuator arm assembly configurations could be utilized as well, such as an "E" block having one or more rigid actuator arm tips or the like that cantilever from a common structure. In any case, movement of the actuator arm assembly 20 is provided by an actuator arm drive assembly, such as a voice coil motor 26 or the like. The voice coil motor 26 is a magnetic assembly that controls the operation of the actuator arm assembly 20 under the direction of control electronics 28. Any appropriate actuator arm assembly drive type may be utilized by the disk drive 10, including a linear drive (for the case where the actuator arm assembly 20 is interconnected with the base plate 12 and/or cover for linear movement versus the illustrated pivoting movement about the pivot bearing 22) and other types of rotational drives.

A load beam or suspension 30 is attached to the free end of each actuator arm 24 and cantilevers therefrom. Typically, the suspension 30 is biased generally toward its corresponding disk 14 by a spring-like force. A slider 32 is disposed at or near the free end of each suspension 30. What is commonly referred to as the "head" (e.g., transducer) is appropriately mounted on the slider 32 and is used in disk drive read/write operations.

The head on the slider 32 may utilize various types of read sensor technologies such as anisotropic magnetoresistive (AMR), giant magnetoresistive (GMR), tunneling magnetoresistive (TuMR), other magnetoresistive technologies, or other suitable technologies. AMR is due to the anisotropic magnetoresistive effect with a normalized change in resistance ($\Delta R/R$) of 2-4%. GMR results from spin-dependent scattering mechanisms between two (or more) magnetic layers. The typical use in recording heads is the spin valve device that uses a pinned magnetic layer and a free layer to detect external fields. The normalized change in resistance is typically 8-12%, but can be as large as 15-20% when used with specular capping layers and spin-filter layers. TuMR is similar to GMR, but is due to spin dependent tunneling currents across an isolation layer. The typical embodiment includes a free layer and a pinned layer separated by a insulating layer of $Al_2O_3$ with the current flowing perpendicular to the film plane, producing normalized change in resistance of 12-25%. The term magnetoresistive is used in this application to refer to all these types of magnetoresistive sensors and any others in which a variation in resistance of the sensor due to the application of an external magnetic field is detected. The write transducer technology of the head of the present invention is discussed in further detail below.

The biasing forces exerted by the suspension 30 on its corresponding slider 32 thereby attempt to move the slider 32 in the direction of its corresponding disk 14. Typically, this biasing force is such that if the slider 32 were positioned over its corresponding disk 14, without the disk 14 being rotated at a sufficient velocity, the slider 32 would be in contact with the disk 14.

The head on the slider 32 is interconnected with the control electronics 28 of the disk drive 10 by a flex cable 34 that is typically mounted on the actuator arm assembly 20. Signals are exchanged between the head and its corresponding data storage disk 14 for disk drive read/write operations. In this regard, the voice coil motor 26 is utilized to pivot the actuator arm assembly 20 to simultaneously move the slider 32 along a path 36 and "across" the corresponding data storage disk 14 to position the head at the desired/required radial position on the disk 14 (i.e., at the approximate location of the correct track on the data storage disk 14) for disk drive read/write operations.

When the disk drive 10 is not in operation, the actuator arm assembly 20 is pivoted to a "parked position" to dispose each slider 32 generally at or beyond a perimeter of its corresponding data storage disk 14, but in any case in vertically spaced relation to its corresponding disk 14. This is commonly referred to in the art as being a dynamic load/unload disk drive configuration. In this regard, the disk drive 10 includes a ramp assembly 38 that is disposed beyond a perimeter of the data storage disk 14 to typically both move the corresponding slider 32 vertically away from its corresponding data storage disk 14 and to also exert somewhat of a retaining force on the actuator arm assembly 20. Any configuration for the ramp assembly 38 that provides the desired "parking" function may be utilized. The disk drive 10 could also be configured to be of the contact start/stop type, where the actuator arm assembly 20 would pivot in a direction to dispose the slider(s) 32 typically toward an inner, non-data storage region of the corresponding data storage disk 14. Terminating the rotation of the data storage disk(s) 14 in this type of disk drive configuration would then result in the slider(s) 32 actually establishing contact with or "landing" on its corresponding data storage disk 14, and the slider 32 would remain on the disk 14 until disk drive operations are re-initiated.

The slider 32 of the disk drive 10 may be configured to "fly" on an air bearing during rotation of its corresponding data storage disk(s) 14 at a sufficient velocity. The slider 32 may be disposed at a pitch angle such that its leading edge is disposed further from its corresponding data storage disk 14 than its trailing edge. The head would typically be incorporated on the slider 32 generally toward its trailing edge since this is positioned closest to its corresponding disk 14. Other pitch angles/orientations could also be utilized for flying the slider 32.

Figure 2:
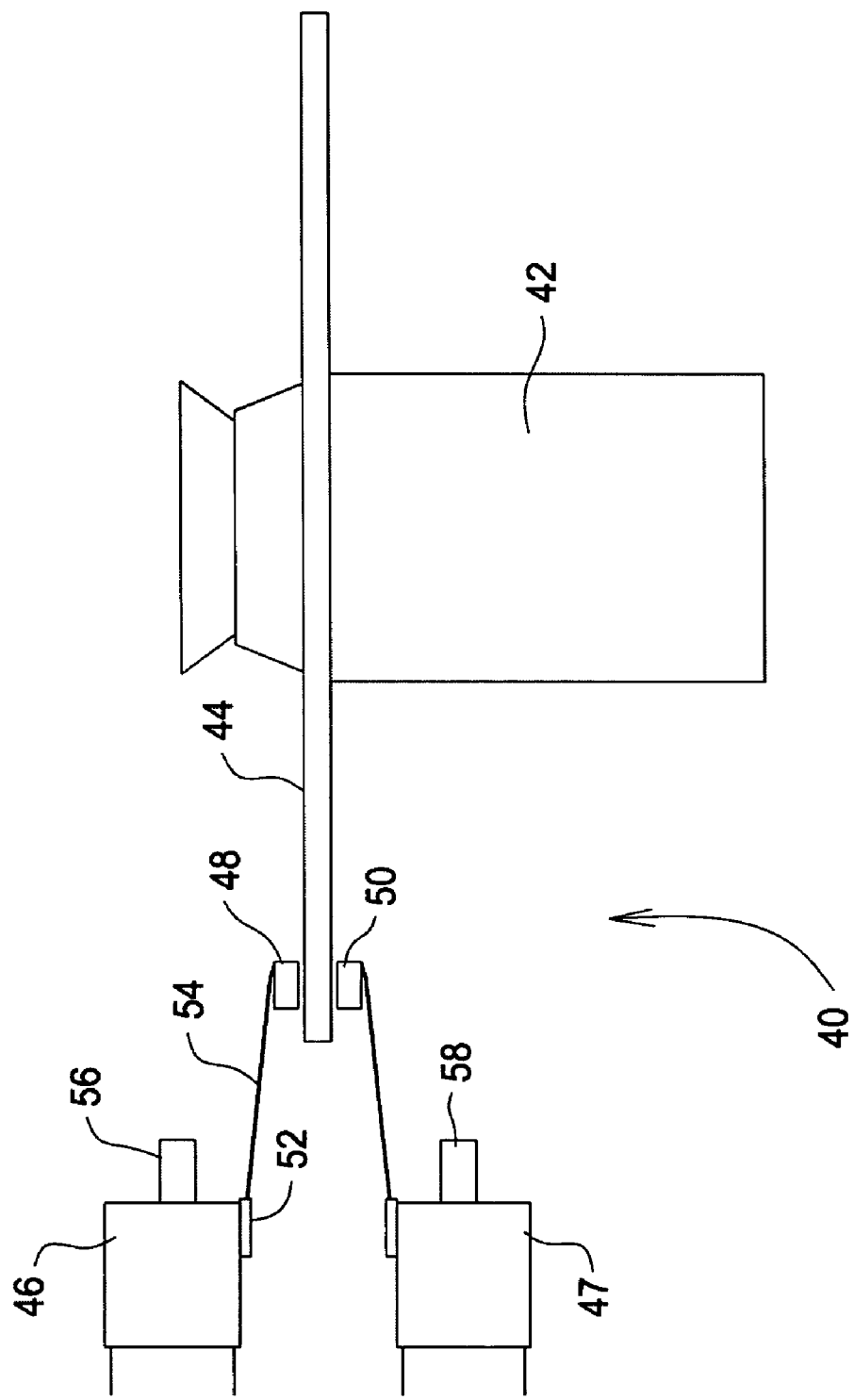
FIG. 2 is a general representation of a glide height test station.

FIG. 2 shows a general representation of a glide height test station 40. The test station 40 includes a spindle 42 onto which a disk 44 can be placed. Adjacent to the spindle 42 and the disk 44 are top and bottom head mounting blocks 46 and 47 to place upper and lower glide heads 48 and 50, respectively, on either side of the disk 44. Associated with each mounting block, for example the top mounting block 46 is a base plate 52 supporting a load beam 54, to which a suspension or flexure 60 (FIGS. 3 and 4) is attached. The mounting blocks 46 and 47 can be selectively moved toward or away from the spindle 42 by movement of a cartridge (not shown) to which the mounting blocks 46 and 47 are attached. An upper and lower sensing device 56 and 58 are mounted directly to the upper and lower mounting blocks 46 and 47, respectively. The sensing devices 56 and 58 in this case may be acoustic-emission sensors. One exemplary type of such sensor is Model No. HD50, available from Physical Acoustics Corporation of Princeton Junction, N.J. With this test station 40 and its various components, the disk 44 can be characterized to determine its glide height by spinning the spindle 42 and disk 44 and measuring contact between the glide heads 48 and 50 and the disk 44.

Figure 3:
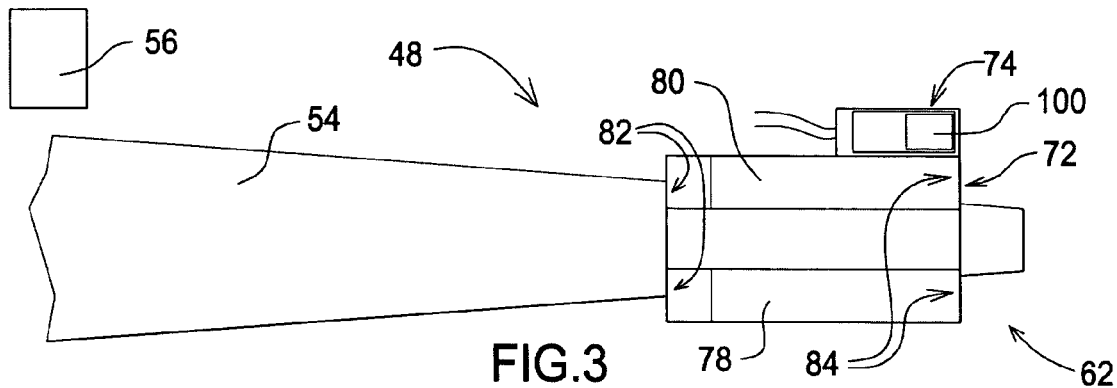
FIG. 3 is a bottom view of a glide head with a side wing.
Figure 4:
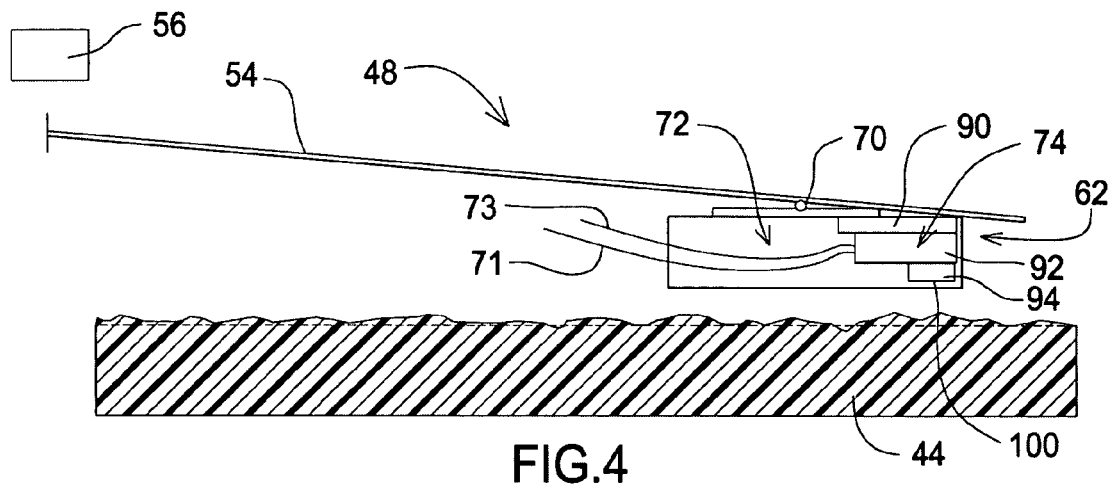
FIG. 4 is a side view of the glide head of FIG. 3.

FIGS. 3 and 4 show a magnified view of the arm 46 and upper glide head 48. These include a load beam 54, a slider 62, and the upper sensing device 56. The slider 62 is mounted to the load beam 54 by a flexure tongue or gimbal 70 at the end of the load beam 54. A pair of lead wires 71 and 73 may run from the head mounting block 46 (of FIG. 2) to a portion of the slider 62. The slider 62 includes a main body 72 and a side wing 74 attached thereto.

The main body 72 may be of any of various suitable types, and may have any suitable air bearing surface (ABS), as long as the slider main body 72 and ABS are able to produce a stable flying height. In this exemplary description, the ABS is of the two-rails Catamaran type. Thus, the main body 72 includes a pair of longitudinally-extending rails 78 and 80 that protrude from the surface of the main body 72. Each of these rails 78 and 80 have a leading edge 82 and a trailing edge 84.

The side wing 74 is attached to the main body in any suitable manner, such as via adhesive. The side wing 74 includes a substrate 90 affixed to the main body 72, an active device 92 affixed to the substrate 90, and a contact layer 94 attached to the active device 92. The substrate 90 may be composed of the same material as the slider main body 72 and, in fact, may be an undivided integral part thereof. The active device 92 may be of any suitable type that varies in size based on a signal applied thereto. In this case, the active device 92 is a piezoelectric transducer that receives electrical signals via the lead wires 71 and 73 to change the shape of and/or extend or stretch the active device 92 in a preferred direction in response to the signal. The contact layer 94 may be a thin, hard, durable layer designed for contact with the rotating disk 44. The active device 92 may not be as durable as the contact layer 94.

In FIG. 4, the bottom surface 100 of the contact layer 94 closest to the rotating disk 44 is shown to be slightly further away from the rotating disk 44 than is the closest surface of the slider main body 72. When the active device 92 is not activated, this bottom surface 100 of the contact layer 94 may be at a generally similar height or distance from the rotating disk 44 as is the slider main body 72 or at any height there above.

As seen in FIG. 3, the bottom surface area of the slider main body 72 is significantly larger than the bottom surface of the side wing 74 facing the disk 44. Accordingly, it is the surface of the slider main body 72 that will primarily determine the flying height of the main body.

Figure 5:
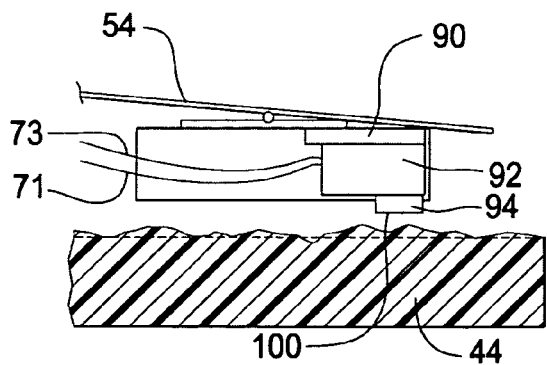
FIG. 5 is a side view of the glide head of FIG. 3 with some amount of extension from the side wing due to activation of the active device.
Figure 6:
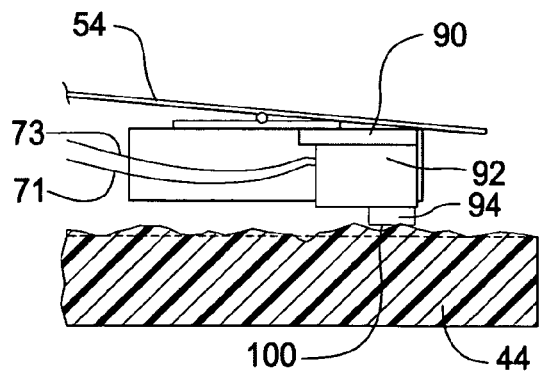
FIG. 6 is a side view of the glide head of FIG. 3 with further extension from the side wing due to greater activation of the active device.

As shown in FIGS. 5 and 6, an electrical signal can be applied to the active device 92 via the lead wires 71 and 73 to reposition the bottom surface 100 of the contact layer 94 at a relatively closer position to the rotating disk 44. FIG. 5 shows an intermediate, extended position for the bottom surface 100 of the contact layer 94, achieved by applying a given electrical signal. It can be seen that the active device 92 has extended in height to displace the bottom surface 100 toward the disk 44. As can be seen in FIG. 6, the bottom surface 100 of the contact layer 94 is at a further, extended position toward the rotating disk 44, achieved by applying a given electrical signal of greater magnitude than the one used to create the geometry shown in FIG. 5. In this position, the active device 92 has increased in height by a greater amount so as to displace the bottom surface 100 further toward the disk 44.

Calibration can be performed for the test station 40 by using a disk having known asperities or bumps of known height. In the calibration process, the relationship between applied voltage and height variation can be established. For example, the required voltage to place the contact layer 94 into contact with one of the bumps can be determined.

While a specific location, geometry, and orientation of the side wing 74 having the active device 92 and contact layer 94 have been shown in FIGS. 4-7, the side wing 74 could be placed on any other location relative to the slider main body 72 and have any other shape, configuration, or orientation as would be suitable for the purpose of being selectably extended toward the rotating disk surface. Furthermore, this extendable portion could be placed on the slider main body rather than on a side wing extending therefrom. In addition, it may not be necessary to have a contact layer, as other configurations may be possible, including having the active device be the portion that comes into contact with the rotating disk. Further, the relative size and position of the substrate 90, active device 92, and contact layer 94 of the slider side wing 74 could be varied. The active device 92 could use a different technique for displacing the bottom surface 100 than a piezoelectric transducer. For example, it may be possible to use a thermal actuator that expands surfaces due to thermal expansion.

Common piezoelectric materials like PZT (Lead Zirconate Titanate) and Barium Titantate (BaTiO$_3$), and other suitable types of piezoelectric materials may be used. The contact layer 94, the substrate 90, and the slider main body 72 may be all composed of typical slider body material, such as Al$_2$O$_3$TiC, or other suitable material. For example, this may be a suitable relatively smooth and small granularity material. Alternatively or in addition, an additional layer or coating could be added to the contact layer 94 to make it smoother or harder.

It can be appreciated that a linear relationship exists between the signal applied to the active device 92 and the fly height. Particularly, for greater applied signals, the fly height will decrease. It can also be appreciated that with the disclosed invention of the glide head with the selectively actuable portion thereon, glide heads can be flown higher than might otherwise be necessary for glide testing and can extend the actuable portion down to close proximity with the disk. Thus, the heads can be flown relatively high and with high velocity. The velocity can be kept constant and thus the measurement results do not become a function of velocity, in order to maintain a constant sensitivity at various glide heights, which may be particularly important when at glide heights less than 1 nanometer. By using a high velocity, the throughput of glide testing can be increased. The glide testing may be a simple pass/fail test. It is also possible to report radius and sector information where the contact or failure occurred.

The foregoing description has been presented for purposes of illustration and description. Furthermore, the description is not intended to limit the invention to the form disclosed herein. While a number of exemplary aspects and embodiments have been discussed above, those of skill in the art will recognize certain variations, modifications, permutations, additions, and sub-combinations thereof. It is therefore intended that the following appended claims and claims hereafter introduced are interpreted to include all such variations, modifications, permutations, additions, and sub-combinations as are within their true spirit and scope.

What is claimed is:

1. A glide head configured to be supported over a surface of a disk by a suspension assembly having a load beam, and a flexure tongue or gimbal on the load beam, for characterizing a disk to be used in a disk drive system, said glide head comprising:
    a main body and a portion separate from the main body that is selectably extendable toward the adjacent disk;
    wherein the main body is configured to be mounted on the load beam by the flexure tongue or the gimbal;
    wherein the selectably extendable portion includes a contact surface that is adapted for physically contacting the disk; and
    wherein the selectable extendable portion is located on a side wing.

2. A glide head as defined in claim 1, wherein the side wing comprises a body attached to a side of the main body.

3. A glide head as defined in claim 1, wherein the selectably extendable portion includes a piezoelectric transducer.

4. A glide head as defined in claim 1, wherein the main body is an integrated circuit comprising a plurality of layers and components.

5. A glide head as defined in claim 1, wherein the material used in the main body is the same as that used in the contact surface.

6. A method of characterizing a disk to be used in a disk drive system, comprising:
    providing a glide head configured to be supported over a surface of a disk by a suspension assembly having a load beam, and a flexure tongue or gimbal on the load beam;
    extending a relatively small portion of the glide head toward the disk while maintaining a separate main body of the glide head at a relatively constant distance away from the disk; and
    rotating the disk to detect portions of the disk at which the relatively small portion of the glide head makes physical contact with the disk;
    wherein the main body is configured to be mounted on the load beam by the flexure tongue or the gimbal.

7. A method as defined in claim 6, wherein the selectably extendable portion is located on a side wing of the glide head.

8. A method as defined in claim 6, wherein the selectably extendable portion includes a contact surface that is adapted for physically contacting the disk.

9. A method as defined in claim 6, wherein the selectably extendable portion includes a piezoelectric transducer.

10. A method as defined in claim 9, wherein the selectably extendable portion includes a contact surface that is adapted for physically contacting the disk.

11. A glide head configured to be supported over a surface of a disk by a suspension assembly having a load beam, and a flexure tongue or gimbal on the load beam, for characterizing a disk to be used in a disk drive system, said glide head comprising:
    a main body; and
    a side wing extending away from the main body, the side wing having a bottom surface that is separate from and significantly smaller than the bottom surface of the main body, the side wing having a transducer thereon to selectably displace at least a portion of the bottom surface of the side wing toward the adjacent disk;
    wherein the main body is configured to be mounted on the load beam by the flexure tongue or the gimbal.

12. A glide head as defined in claim 11, wherein the bottom surface of the side wing includes a contact surface that is adapted for physically contacting the disk.

13. A glide head as defined in claim 11, wherein the transducer is a piezoelectric transducer.

14. A glide head as defined in claim 13, wherein the bottom surface of the side wing includes a contact surface that is adapted for physically contacting the disk.

15. A system for characterizing a disk to be used in a disk drive system, comprising:
    a spindle that rotates the disk to be characterized;
    a glide head; and
    a suspension assembly having a load beam, and a flexure tongue or gimbal on the load beam that positions the glide head in close proximity to the disk;
    wherein the glide head has a main body and a portion separate from the main body that is selectably extendable toward the adjacent disk, wherein the portion may be extended until it comes into physical contact with the disk; and wherein the main body is configured to be mounted on the load beam by the flexure tongue or the gimbal;

said system further including a sensor associated with the suspension, the sensor sensing mechanical vibrations in the suspension indicative of physical contact between the glide head and the disk; and wherein the selectable extendable portion is located on a side wing.

16. A glide head as defined in claim 15, wherein the selectably extendable portion includes a piezoelectric transducer.

17. A glide head as defined in claim 15, wherein the selectably extendable portion includes a contact surface that is adapted for physically contacting the disk.

18. A glide head as defined in claim 15, wherein the selectably extendable portion includes a contact surface that is adapted for physically contacting the disk.

19. A glide head configured to be supported over a surface of a disk by a suspension assembly having a load beam, and a flexure tongue or gimbal on the load beam, for characterizing a disk to be used in a disk drive system, said glide head comprising:

a main body and a portion separate from the main body that is selectably extendable toward the adjacent disk;

wherein the main body is configured to be mounted on the load beam by the flexure tongue or the gimbal;

wherein the selectably extendable portion includes a contact surface that is adapted for physically contacting the disk; and wherein the selectably extendable portion includes a piezoelectric transducer.

20. A glide head configured to be supported over a surface of a disk by a suspension assembly having a load beam, and a flexure tongue or gimbal on the load beam, for characterizing a disk to be used in a disk drive system, said glide head comprising:

a main body and a portion separate from the main body that is selectably extendable toward the adjacent disk;

wherein the main body is configured to be mounted on the load beam by the flexure tongue or the gimbal;

wherein the selectably extendable portion includes a contact surface that is adapted for physically contacting the disk; and wherein the main body is an integrated circuit comprising a plurality of layers and components.

21. A system for characterizing a disk to be used in a disk drive system, comprising:

a spindle that rotates the disk to be characterized;

a glide head; and a suspension assembly having a load beam, and a flexure tongue or gimbal on the load beam that positions the glide head in close proximity to the disk;

wherein the glide head has a main body and a portion separate from the main body that is selectably extendable toward the adjacent disk, wherein the portion may be extended until it comes into physical contact with the disk; and wherein the main body is configured to be mounted on the load beam by the flexure tongue or the gimbal;

said system further including a sensor associated with the suspension, the sensor sensing mechanical vibrations in the suspension indicative of physical contact between the glide head and the disk; and wherein the selectably extendable portion includes a piezoelectric transducer.

22. A system for characterizing a disk to be used in a disk drive system, comprising:

a spindle that rotates the disk to be characterized;

a glide head; and a suspension assembly having a load beam, and a flexure tongue or gimbal on the load beam that positions the glide head in close proximity to the disk;

wherein the glide head has a main body and a portion separate from the main body that is selectably extendable toward the adjacent disk, wherein the portion may be extended until it comes into physical contact with the disk; and wherein the main body is configured to be mounted on the load beam by the flexure tongue or the gimbal;

said system further including a sensor associated with the suspension, the sensor sensing mechanical vibrations in the suspension indicative of physical contact between the glide head and the disk; and wherein the selectably extendable portion includes a contact surface that is adapted for physically contacting the disk.

* * * * *